(12) United States Patent
Yoshikawa et al.

(10) Patent No.: US 10,599,608 B2
(45) Date of Patent: Mar. 24, 2020

(54) CALCULATOR, METHOD OF REGISTERING OPERAND IN CALCULATOR, AND COMPUTER-READABLE NON-TRANSITORY STORAGE MEDIUM

(71) Applicant: CASIO COMPUTER CO., LTD., Tokyo (JP)

(72) Inventors: Hironori Yoshikawa, Tokyo (JP); Hiroaki Yoshizawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 9 days.

(21) Appl. No.: 15/874,563

(22) Filed: Jan. 18, 2018

(65) Prior Publication Data

US 2018/0203821 A1 Jul. 19, 2018

(30) Foreign Application Priority Data

Jan. 19, 2017 (JP) ................................. 2017-007254

(51) Int. Cl.
  *G06F 3/023* (2006.01)
  *G06F 15/02* (2006.01)
(52) U.S. Cl.
  CPC ........ *G06F 15/0225* (2013.01); *G06F 15/025* (2013.01)
(58) Field of Classification Search
  None
  See application file for complete search history.

(56) References Cited

U.S. PATENT DOCUMENTS

| | | | | | |
|---|---|---|---|---|---|
| 4,158,285 | A | * | 6/1979 | Heinsen | G04F 10/04 341/22 |
| 4,885,714 | A | * | 12/1989 | Eisenstein | G06F 9/44 708/131 |
| 5,528,524 | A | * | 6/1996 | Oba | G06F 15/02 708/142 |
| 7,956,843 | B2 | * | 6/2011 | Fux | G06F 3/0236 345/168 |
| 2009/0210466 | A1 | * | 8/2009 | Katayama | G06F 15/16 708/136 |
| 2018/0203821 | A1 | * | 7/2018 | Yoshikawa | G06F 15/0225 |

FOREIGN PATENT DOCUMENTS

JP         53-53225 A         5/1978

\* cited by examiner

*Primary Examiner* — David H Malzahn
(74) *Attorney, Agent, or Firm* — Chen Yoshimura LLP

(57) ABSTRACT

A calculator includes: a plurality of numeric keys; a plurality of operation keys; a delimiter key; a memory; and a processor, wherein said processor is configured to: when a first numerical data having at least a first integer, a delimiter, and a second integer arranged in that order has been received, upon receiving a prescribed operation of one of said plurality of operation keys, registers said first integer in said memory as a first operand, and registers said second integer in said memory as a second operand; and registers in said memory a target-operand that has been inputted via an operation or operations of at least one of said plurality of numeric keys, and performs a prescribed arithmetic operation on said target-operand registered in said memory using a plurality of registered operands that include the registered first and second operands.

20 Claims, 10 Drawing Sheets

FIG. 5C  [÷ remainder]  remainder 109.

FIG. 5D  42 · 14 · 7  remainder 42. 147

FIG. 5E  (divisor display/conversion)  divisor 1  divisor 2  divisor 3  remainder  42 - 14 - 7 divisor 1  divisor 2  divisor 3  remainder  42 - 14 - divisor 1  divisor 2  divisor 3  remainder  42 - 14 divisor 1  divisor 2  divisor 3  remainder  42 - 14 -

FIG. 5I  5  divisor 1  divisor 2  divisor 3  remainder  42 - 14 - 5 quotient 1  quotient 2  quotient 3  remainder  remainder  2 - 1 - 2 - 1

FIG. 6C  [÷ remainder]  ←remainder  42.14

FIG. 6D  [÷ remainder]  K   divisor 1   divisor 2   ←remainder
42 – 14

FIG. 6E  107  K   ←remainder
107.

FIG. 6F  [=]  K quotient 1 quotient 2 remainder  ←remainder
2 – 1 – 9

FIG. 6G  240  K   remainder
240.

FIG. 6H  [=]  K quotient 1 quotient 2 remainder  ←remainder
5 – 2 – 2

FIG. 7C  [÷ remainder]  | ◌remainder  42. 147

FIG. 7D  [÷ remainder]  | K  divisor 1  divisor 2  divisor 3  ◌remainder
42 – 14 – 7

FIG. 7E  107  | K  ◌remainder
107.

FIG. 7F  [=]  | K  quotient 1  quotient 2  quotient 3  remainder ◌remainder
2 – 1 – 1 – 2

FIG. 7G  240  | K  ◌remainder
240.

FIG. 7H  [=]  | K  quotient 1  quotient 2  quotient 3  remainder ◌remainder
5 – 2 – 0 – 2

FIG. 8C   [÷ remainder]   remainder  168. 4221

FIG. 8D   [÷ remainder]   K  divisor 1  divisor 2  divisor 3  remainder
168−42−21

FIG. 8E   310   K   remainder
310.

FIG. 8F   [=]   K  quotient 1  quotient 2  quotient 3  remainder
1 − 3 − 0 −16

FIG. 8G   375   K   remainder
375.

FIG. 8H   [=]   K  quotient 1  quotient 2  quotient 3  remainder
2 − 0 − 1 −18

FIG. 9C  [÷ remainder]  | ÷remainder<br>168. 42 |

FIG. 9D  [÷ remainder]  | K  divisor 1  divisor 2  ÷remainder<br>168–42 |

FIG. 9E  (divisor display/conversion)  | K  divisor 1  divisor 2  divisor 3  ÷remainder<br>168– 4 – 2 |

FIG. 9F  310  | K  ÷remainder<br>310. |

FIG. 9G  [=]  | K  quotient 1  quotient 2  quotient 3  remainder  ÷remainder<br>1 –35– 1 – 0 |

FIG. 9H  375  | K  ÷remainder<br>375. |

FIG. 9I  [=]  | K  quotient 1  quotient 2  quotient 3  remainder  ÷remainder<br>2 – 9 – 1 – 1 |

CALCULATOR, METHOD OF REGISTERING OPERAND IN CALCULATOR, AND COMPUTER-READABLE NON-TRANSITORY STORAGE MEDIUM

BACKGROUND OF THE INVENTION

Technical Field

The present invention relates to a calculator, a method of registering an operand in the calculator, and a computer-readable non-transitory storage medium.

Background Art

Patent Document 1 discloses a calculator in which, when an operation key is operated a plurality of times, an inputted numeric value is saved to a constant memory as an operand, and thereafter, when a numeric value is inputted and "=" is pressed, the inputted numeric value serves as a "target-operand", and an operation is executed using the "operand" in the constant memory.

Also, this calculator is convenient in a case where a calculation is performed repeatedly using the same "operand" because, when an "operand" is saved to the constant memory one time, it becomes possible, by simply inputting a numeric value and pressing "=", to treat the inputted numeric value as a "target-operand", and to execute a calculation repeatedly using the "operand" in the constant memory.

RELATED ART DOCUMENTS

Patent Documents

Patent Document 1: Japanese Patent Application Laid-Open Publication No. 53-53225

SUMMARY OF THE INVENTION

However, in the calculator of Patent Document 1, it is not possible to set a plurality of sets of operands in the constant memory, and therefore, when performing a quotient and remainder computation (may be described as ÷ remainder computation below), which presents a user with a quotient and a remainder as the results of division, for example, there are cases where it is desirable to perform a computation using a plurality of sets of divisors (operands), but a computation such as this cannot be performed.

As a specific example, when there are packing containers or the like that have been previously divided up as to large, medium, and small, in which the number of goods stored is the most numerous in the large packing containers, the next most numerous in the medium packing containers, and the least numerous in the small packing containers and so forth, it is necessary to determine, among other things, how many large, medium, and small packing containers are required in accordance with the number of goods that have been ordered, but the calculator of Patent Document 1 does not have a function corresponding to this kind of computation.

However, in a function calculator or the like, there is provided a plurality of constant memories (e.g., A to F), thereby also making it possible for a user to set a numeric value constituting a divisor (operand) in each memory, and to perform computations using a plurality of sets of divisors (operands), but the complexity involved in setting operations and reading operations is problematic.

With this situation in view, an object of the present invention is to provide a calculator that makes it possible, with simple operations, to register a plurality of operands and to perform computation using the plurality of operands, a method of registering an operand in such a calculator, and a computer-readable non-transitory storage medium.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a calculator including: a plurality of numeric keys; a plurality of operation keys; a delimiter key; a memory; and a processor, wherein said processor is configured to: when a first numerical data having at least a first integer, a delimiter, and a second integer arranged in that order has been received via operations by a user of said delimiter key and at least one of said plurality of numeric keys and when the first integer is larger than the second integer or the first integer is an integer multiple of the second integer, upon receiving a prescribed operation of one of said plurality of operation keys, registers said first integer in said memory as a first operand, and registers said second integer in said memory as a second operand; and when another of said plurality of operation keys is operated after registration of said first integer and said second integer in said memory, registers in said memory a target-operand that has been inputted via an operation or operations of at least one of said plurality of numeric keys, and performs a prescribed arithmetic operation on said target-operand registered in said memory using a plurality of registered operands that include the registered first and second operands.

In another aspect, the present disclosure provides a method performed by a processor in a calculator that includes: a plurality of numeric keys; a plurality of operation keys; a delimiter key; a memory; and said processor, the method including: when a first numerical data having at least a first integer, a delimiter, and a second integer arranged in that order has been received via operations by a user of said delimiter key and at least one of said plurality of numeric keys and when the first integer is larger than the second integer or the first integer is an integer multiple of the second integer, upon receiving a prescribed operation of one of said plurality of operation keys, registering said first integer in said memory as a first operand, and registering said second integer in said memory as a second operand; and when another of said plurality of operation keys is operated after registration of said first integer and said second integer in said memory, registering in said memory a target-operand that has been inputted via an operation or operations of at least one of said plurality of numeric keys, and performing a prescribed arithmetic operation on said target-operand registered in said memory using a plurality of registered operands that include the registered first and second operands.

In another aspect, the present disclosure provides a computer-readable non-transitory storage medium having stored thereon a program that causes a processor in a calculator that includes: a plurality of numeric keys; a plurality of operation keys; a delimiter key; a memory; and said processor, to perform the following: when a first numerical data having at least a first integer, a delimiter, and a second integer arranged in that order has been received via operations by a user of said delimiter key and at least one of said plurality of numeric keys and when the first integer is larger than the second integer or the first integer is an integer multiple of the second integer, upon receiving a prescribed operation of one of said plurality of operation keys, registering said first integer in said memory as a first operand, and registering said second integer in said memory as a second operand; and when another of said plurality of operation keys is operated after registration of said first integer and said second integer in said memory, registering in said memory a target-operand that has been inputted via an operation or operations of at least one of said plurality of numeric keys, and performing a prescribed arithmetic operation on said target-operand registered in said memory using a plurality of registered operands that include the registered first and second operands.

According to the present invention, it is possible to provide a calculator capable of registering a plurality of operands, and performing calculations using the plurality of operands with simple operations.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 5A to 5J are illustrations showing a first operation example of the calculator according to the embodiment of the present invention.

FIGS. 6A to 6H are illustrations showing a second operation example of the calculator according to the embodiment of the present invention.

FIGS. 7A to 7H are illustrations showing a third operation example of the calculator according to the embodiment of the present invention.

FIGS. 8A to 8H are illustrations showing a fourth operation example of the calculator according to the embodiment of the present invention.

FIGS. 9A to 9I are illustrations showing a fifth operation example of the calculator according to the embodiment of the present invention.

DETAILED DESCRIPTION OF THE EMBODIMENT

Figure 1:
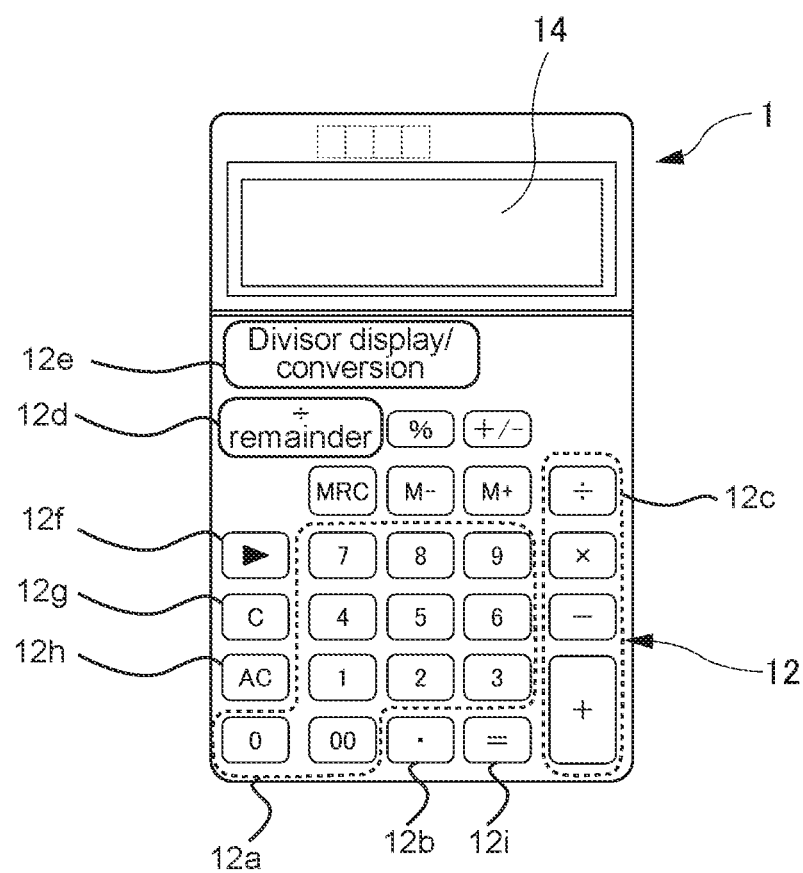
FIG. 1 is a front view of a calculator according to an embodiment of the present invention.

The modes for carrying out the present invention (hereinafter referred to as "embodiments") will be explained in detail below on the basis of the accompanying drawings.

Furthermore, the same reference characters are given to the same elements throughout the entire description of the embodiments.

<Overall Configuration of Calculator>

Figure 2:
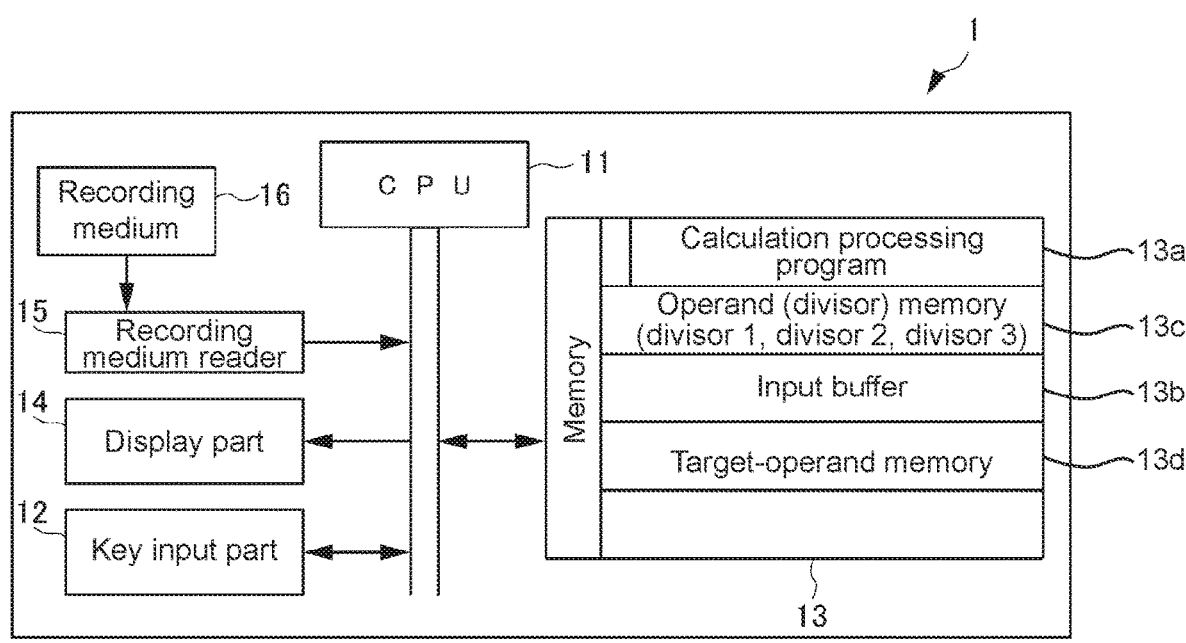
FIG. 2 is a block diagram showing a configuration of the calculator according to the embodiment of the present invention.

FIG. 1 is a front view of a calculator 1 according to an embodiment of the present invention, and FIG. 2 is a block diagram showing a configuration of the calculator 1 according to the embodiment of the present invention. As shown in FIGS. 1 and 2, the operational control of the calculator 1 is performed by a CPU 11. A key input part 12, as well as a memory 13, a display part 14, and a recording medium reader 15 are connected to the CPU 11.

The key input part 12 is provided with a numeric keypad 12a of "0" to "9", and "00" (plurality of numeric keys) for numerical computations, a decimal point key 12b of "." (delimiter key), operator keys 12c of "+, −, ×, ÷", a quotient and remainder computation key 12d of "÷ remainder" (operation key), a divisor display/conversion key (display key) 12e of "divisor display/conversion", a correction 12f of key "right-facing black triangle (see FIG. 1)", a clear key 12g of "C", a clear all key 12h of "AC", a computation execution key (operation key) 12i of "=", and so forth.

The aforementioned quotient and remainder computation key "÷ remainder" 12d here is operated instead of the aforementioned conventional division operator key "÷" 12c when performing a quotient and remainder computation that calculates a quotient obtained by dividing a target-operand by an operand, and a remainder obtained by dividing the target-operand by the operand.

The functions of the divisor display/conversion key "divisor display/conversion" 12e and the correction key 12f will be described later.

The memory 13 is configured using ROM and RAM.

A computation program that allows the CPU 11 to function as a multiple-operands registering means and operating means is stored in a ROM 13a of the memory 13, and processing, which will be explained hereinafter, is executed by the CPU 11 serving as the multiple-operands registering means and operating means; hereinafter, only the CPU 11 will be described.

Key-inputted numerical data and the like are stored in the RAM of the memory 13 as required.

Inside the RAM of the memory 13, for example, there is provided an input buffer 13b that temporarily stores key-inputted numerical data, an operand memory 13c in which a plurality of operands (first operand, second operand, and third operand) is registered, and a target-operand memory 13d in which a target-operand is registered.

Furthermore, in the description and drawings below, an operand is written as a divisor, a first operand is written as either operand 1 or divisor 1, a second operand is written as either operand 2 or divisor 2, and a third operand is written as either operand 3 or divisor 3, as appropriate.

The display part 14 displays operand numerical data, operation symbols, constant lock characters, character strings describing computation results, and so forth corresponding to key input operations of the key input part 12.

As will be described later by referring to FIGS. 5A to 9I, for example, when the quotient and remainder computation key "÷ remainder" 12d is operated, an operation symbol "÷ remainder" of the quotient and remainder computation is displayed, when the quotient and remainder computation key "÷ remainder" 12d is operated successively, a constant lock character "K" is displayed together with the operation symbol "÷ remainder" of the quotient and remainder computation, and in a case where a plurality of operands (divisors) have been registered, "divisor 1", "divisor 2", and "divisor 3" are displayed as descriptive character strings thereof together with registered numerical data, and in a display mode for the results of a quotient and remainder computation using a plurality of operands, "quotient 1", "quotient 2", "quotient 3", and "remainder" are displayed as character strings describing the computation results.

The recording medium reader 15 reads data and programs from a recording medium 16 such as a removable flash memory.

First Operation Example

Next, procedures, shown in FIGS. 3 and 4, for controlling the calculator 1 according to the present embodiment will be described while referring to operation examples shown in FIGS. 5A to 9I.

Note that the quotient and remainder computation will be referred to as a "÷ remainder" operation in the following description.

Figure 3:
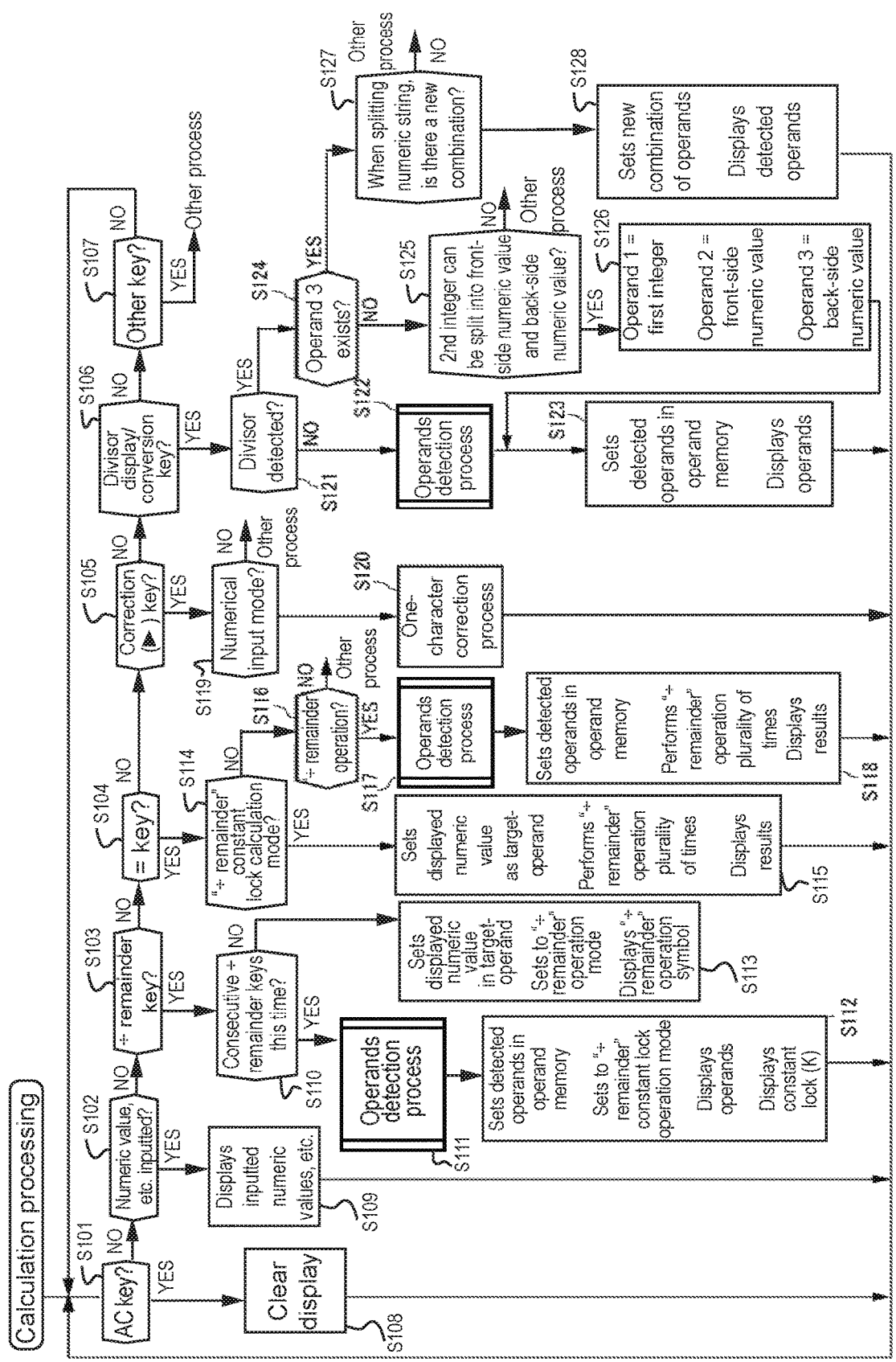
FIG. 3 is a flowchart showing a control procedure (main routine) of the calculator according to the embodiment of the present invention.
Figure 4:
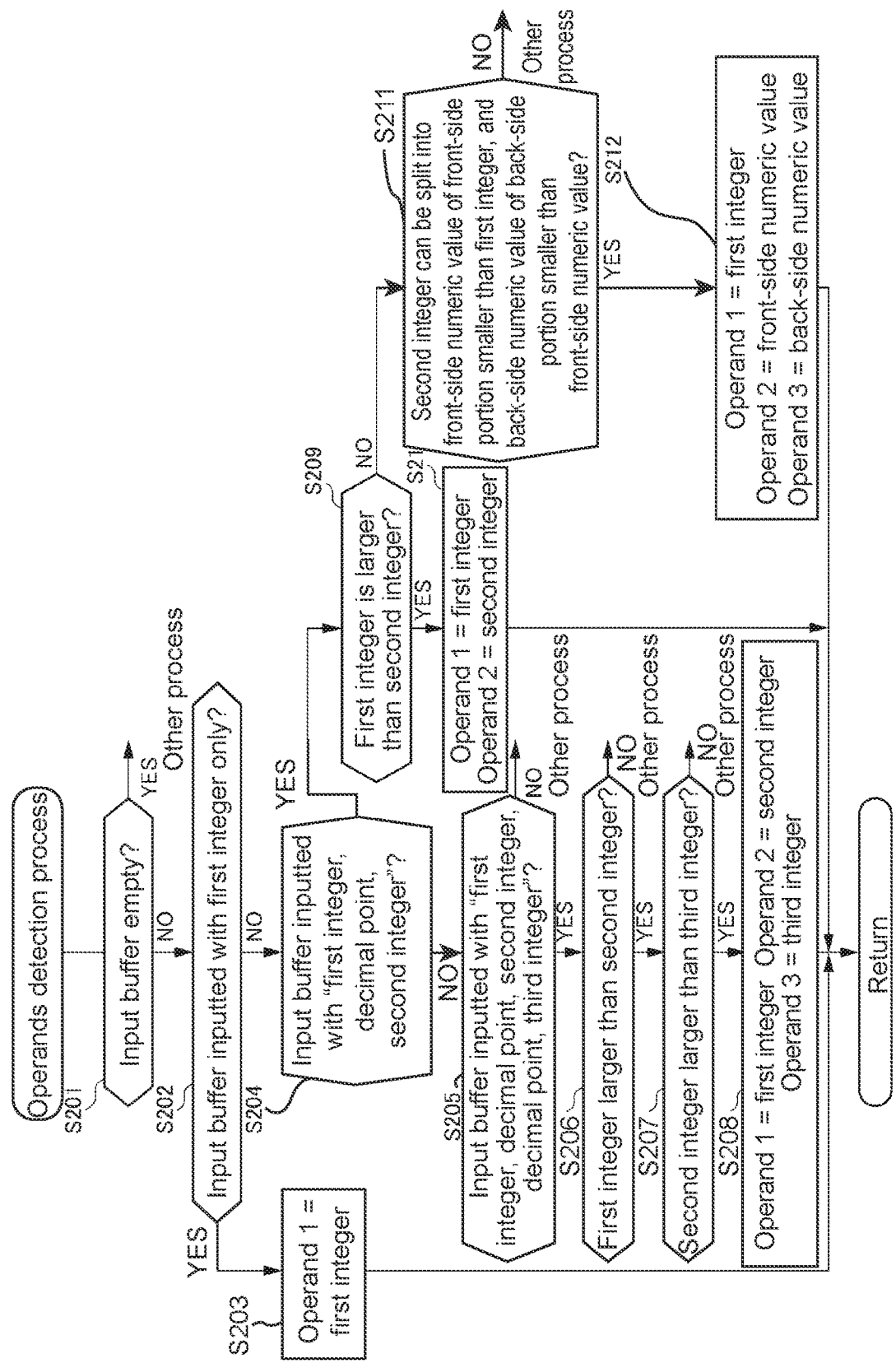
FIG. 4 is a flowchart showing a control procedure (subroutine) of the calculator according to the embodiment of the present invention.

FIG. 3 is a flowchart showing a control procedure (main routine) of the calculator 1 according to the embodiment of the present disclosure, FIG. 4 is a flowchart showing a control procedure (subroutine) of the calculator 1 according to the embodiment of the present disclosure, and FIGS. 5A to 5J are illustrations showing a first operation example of the calculator 1 according to the embodiment of the present disclosure.

Furthermore, in FIGS. 5A to 5J, the contents of an input part 12 operation performed by a user are shown on the left side, and the contents of a display displayed in the display part 14 when the operation has been performed are shown on the right side; the same holds true for FIGS. 6A to 9I referred to later.

When the power is turned ON, the calculator 1 monitors whether any of the operations of Steps S101 through S107 is performed, as shown in FIG. 3.

When the "AC" key 12h is pressed, the CPU 11 determines that "AC key?" (Step S101) of FIG. 3 is YES, and, as shown in FIG. 5A, clears the mode displayed on the display part 14 (numeric value, constant lock, and so forth), and displays "0.", which is the initial display, in the display part 14 (Step S108).

Next, when a numeric value "109" (first numerical data) is inputted, that is, when a numeric value "1" input, a numeric value "0" input, and a numeric value "9" input are performed, the CPU 11 determines that "numeric value, etc. inputted?" (Step S102) of FIG. 3 is YES repeatedly three times, and in accordance with repeating the processing of Step S109 three times, as shown in FIG. 5B, the CPU 11 displays the numeric value "109." in the display part 14.

Furthermore, the inputted numerical data is stored in the input buffer 13b of the memory 13.

Next, when the "÷ remainder" key 12d is pressed, the CPU 11 determines that "÷ remainder key?" (Step S103) of FIG. 3 is YES, and because the "÷ remainder" key 12d is operated one time here, the CPU 11 subsequently determines that "consecutive ÷ remainder keys this time?" (Step S110) of FIG. 3 is NO.

Also, the CPU 11 registers the displayed numeric value "109" in the target-operand memory 13d of the memory 13 as a target-operand of the "÷ remainder" operation, and as shown in FIG. 5C, displays the operation symbol "÷ remainder" above the numeric value "109" in the display part 14 (Step S113).

Next, when numerical data (also called second numerical data), that has at least a first integer, a decimal point, and a second integer arranged in that order, is inputted as in first integer "42", decimal point ".", second integer "14", decimal point ".", and third integer "7", the CPU 11 determines that "numeric value, etc. inputted? (Step S102) of FIG. 3 is YES repeatedly seven times, and in accordance with repeating the processing of Step S109 seven times, as shown in FIG. 5D, the CPU 11 displays the numeric values "42. 147" in the display part 14.

In the present embodiment, the display of a decimal point that has been inputted for a second time is omitted from the display part 14.

Next, when the "divisor display/conversion" key 12e is pressed, the CPU 11 determines that "divisor display/conversion key?" (Step S106) of FIG. 3 is YES, and since the display part 14 is displaying the numeric values "42. 147" at this time, the CPU 11 determines that "divisor detected? (divisors displayed in format of divisor 1-divisor 2 . . . ?)" (Step S121) of FIG. 3 is NO, and executes an "operands detection process" of FIG. 4, which is a subroutine (Step S122).

When the "operands detection process" shown in FIG. 4 is executed, since "42. 14. 7" (first integer, decimal point, second integer, decimal point, third integer) is stored in the input buffer 13b of the memory 13 the CPU 11 determines that "input buffer empty?" (Step S201) of FIG. 4 is NO, determines that "input buffer inputted with first integer only?" (Step S202) of FIG. 4 is NO, further determines that "input buffer inputted with 'first integer, decimal point, second integer'?" (Step S204) of FIG. 4 is NO, and determines that "input buffer inputted with 'first integer, decimal point, second integer, decimal point, third integer'?" (Step S205) of FIG. 4 is YES.

Since the first integer "42" is larger than the second integer "14", and the second integer "14" is larger than the third integer "7", the CPU 11 determines that "first integer larger than second integer?" (Step S206) of FIG. 4 is YES, also determines that "second integer larger than third integer?" (Step S207) of FIG. 4 is YES, performs processing (Step S208) that detects the first integer as operand 1, detects the second integer as operand 2, and detects the third integer as operand 3, and returns to the main routine.

Upon returning to the main routine, the CPU 11 registers, in the operand memory 13c of memory 13, the respective operands (operand 1 "42", operand 2 "14", and operand 3 "7") detected in the "operands detection process", and, as shown in FIG. 5E, displays the operands in the display part 14 in the format "divisor 1-divisor 2-divisor 3" (Step S123).

Specifically, the operands "42", "14", "7" are displayed in a numeric value display area of the display part 14 in a connected format using hyphens "-", and "divisor 1", "divisor 2", "divisor 3", which are character strings describing the operands, are respectively displayed in corresponding positions thereabove.

That is, in the "operands detection process" and a step that follows thereafter (e.g., Step S123), the CPU 11 functions as a multiple-operands registering means, and, for numerical data that has been inputted in response to a user operation and that has at least a first integer, a decimal point, and a second integer arranged in that order, executes processing for registering the first integer as operand 1, and registering the second integer as operand 2.

As described above, when the target-operand is registered in the target-operand memory 13d of the memory 13, and the operands (operand 1, operand 2, and operand 3) are registered in the operand memory 13c of the memory 13, it becomes possible for the CPU 11 to execute, in response to an "=" key 12i operation, "÷ remainder" operation of a target-operand using a plurality of operands that will be described later, but in the first operation example shown in FIGS. 5A to 5J, there is included an operation (FIG. 5F to 5I) for correcting the operands displayed in the display part 14, and more specifically, the "÷ remainder" operation is executed after operand 3 has been corrected from "7" to "5".

Specifically, as shown in FIG. 5E, when the correction key 12f is pressed while the operands "42-14-7" are being displayed in the display part 14, the CPU 11 determines that "correction key?" (Step S105) of FIG. 3 is YES, also determines that "numerical input mode?" (Step S119) of FIG. 3 is YES, and performs a one-character correction process (Step S120) that deletes the right end of the numerical data being displayed in the display part 14, and moves the numerical data in its entirety to the right side.

Figure 5F:

That is, when the correction key 12f is pressed while the operands "42-14-7" are being displayed in the display part 14, as shown in FIG. 5F, the CPU 11 deletes the "7" on the right end, and moves the "42-14-" to the right side.

Subsequently, when the correction key 12f is pressed one more time, the CPU 11 determines once again that "correction key?" (Step S105) of FIG. 3 is YES, also determines that "numerical input mode?" (Step S119) of FIG. 3 is YES, and performs a one-character correction process (Step S120) that deletes the right end of the numerical data being displayed in the display part 14, and moves the numerical data in its entirety to the right side.

Figure 5G:

Specifically, when the correction key 12f is pressed while the operands "42-14-" are being displayed in the display part 14, as shown in FIG. 5G, the CPU 11 deletes the "-" on the right end, and moves the "42-14" to the right side.

Figure 5H:

Next, when the decimal point "." key 12b is pressed, the CPU 11 determines that "numeric value, etc. inputted? (Step S102) of FIG. 3 is YES, and inserts the inputted numeric value or the like at the right end of the displayed numeric values of the display part 14, but since the operands are being displayed, as shown in FIG. 5H, does not insert the decimal point "." as-is, but rather inserts the decimal point "." as a hyphen "-" (Step S109).

Next, when a numeric value "5" is inputted, the CPU 11 determines that "numeric value, etc. inputted? (Step S102) of FIG. 3 is YES, and as shown in FIG. 5I, inserts the inputted numeric value "5" at the right end of the numeric values displayed in the display part 14 (Step S109).

Furthermore, in accordance with the correction operation described above, the contents stored in the input buffer 13b, i.e., "42. 14. 7" (first integer, decimal point, second integer, decimal point, third integer), are corrected to "42. 14. 5" (first integer, decimal point, second integer, decimal point, third integer).

Next, when the "=" key 12i is pressed, the CPU 11 determines that "=key?" (Step S104) of FIG. 3 is YES, determines that "'÷ remainder' constant lock calculation mode?" (Step S114) of FIG. 3 is NO, and, in addition, determines that "'÷ remainder' operation?" (Step S116) of FIG. 3 is YES, and executes the "operands detection process" described previously (Step S117).

The only contents stored in the input buffer 13b are "42. 14. 5", and the contents themselves on which the "operands detection process" is performed are the same as when the contents stored in the input buffer 13b were "42. 14. 7".

Therefore, a detailed description referencing FIG. 4 will be omitted, but the CPU 11 executes the "operands detection process" of FIG. 4, detects operand 1 "42", operand 2 "14", and operand 3 "5" as the operands, and returns to the main routine.

Also, upon returning to the main routine, the CPU 11 registers, in the operand memory 13c of the memory 13, the operands (operand 1 "42", operand 2 "14", operand 3 "5") detected in the "operands detection process", executes a "÷ remainder" operation a plurality of times using the operands "42", "14" and "5" with respect to the target-operand "109" registered in the target-operand memory 13d, and displays the respective quotients and remainder in the display part 14 using the format "quotient 1-quotient 2-quotient 3-remainder" (Step S118).

That is, in Step S118, the CPU 11 functions as an operating means, and performs processing that operates on the target-operand using a plurality of registered operands.

Specifically, the CPU 11 produces, as quotient 1, a quotient "2" obtained by dividing the target-operand "109" by the largest operand 1 "42", produces, as quotient 2, a quotient "1" obtained by dividing the remainder thereof "25" by the next largest operand 2 "14", produces, as quotient 3, a quotient "2" obtained by dividing the remainder thereof "11" by the smallest operand 3 "5", and produces the remainder thereof "1" as the final remainder.

Figure 5J:

Also, as shown in FIG. 5J, the CPU 11 displays quotient 1 "2", quotient 2 "1", quotient 3 "2", and remainder "1" in the numeric value display area of the display part 14 in a connected format using hyphens "-", and in corresponding positions thereabove, displays "quotient 1", "quotient 2", "quotient 3", and "remainder", which are character strings describing the results of the calculation.

According to the first operation example of calculator 1 described above, when a calculation execution operation is performed in response to user operations by sequentially inputting first numerical data (the first numerical data in the aforementioned example is 109), pressing the "÷ remainder" key 12d one time, inputting second numerical data having at least a first integer, a decimal point, and a second integer arranged in that order (in the aforementioned example, the second numerical data are arranged in the order of a first integer, a decimal point, a second integer, a decimal point, and a third integer), and pressing the "=" key 12i, the CPU 11 registers the first integer of the second numerical data as a first operand, registers the second integer as a second operand (since a third integer exists in the aforementioned example, an operation is also performed to register the third integer as a third operand), and thereafter, treating the first numerical data as a target-operand, repeatedly performs division operations whereby a remainder, which is obtained by dividing the target-operand by the operand having the largest numeric value (first operand) of the plurality of operands is divided by an operand having the next largest numeric value (second operand, and third operand), calculates the quotients and remainder of the plurality of operands, and displays the results thereof in the display part 14, thereby making it possible, with simple operations, to register a plurality of operands, and to perform a "÷ remainder" calculation that uses the plurality of operands.

Furthermore, when the "divisor display/conversion" key 12e is pressed subsequent to the input of the second numerical data, the CPU 11 registers the first integer of the second numerical data as a first operand, registers the second integer as a second operand, and thereafter displays the plurality of operands in the display part 14, thereby making the plurality of registered operands easily recognizable.

Furthermore, in the aforementioned example, since a third integer exists, the third integer is registered as a third operand, and this third operand is also displayed in the display part 14.

Furthermore, since the plurality of registered operands can be easily corrected on the basis of operating a correction key 12*f* or the like, even in a case where an error has occurred in the inputting of the second numerical data, there is no need to start over again from the inputting of the first numerical data.

Second Operation Example

FIGS. 6A to 6H are illustrations showing a second operation example of the calculator 1 according to the embodiment of the present invention.

When the "AC" key 12*h* is pressed, the CPU 11 determines that "AC key?" (Step S101) of FIG. 3 is YES, and as shown in FIG. 6A, clears the mode displayed on the display part 14 (numeric value, constant lock, and so forth), and displays "0.", which is the initial display, in the display part 14 (Step S108).

Next, when numerical data having at least a first integer, a decimal point, and a second integer arranged in that order is inputted as in first integer "42", decimal point ".", and second integer "14", the CPU 11 determines that "numeric value, etc. inputted? (Step S102) of FIG. 3 is YES repeatedly five times, and in accordance with repeating the processing of Step S109 five times, as shown in FIG. 6B, the CPU 11 displays the numeric values "42. 14" in the display part 14.

Next, when the "÷ remainder" key 12*d* is pressed, the CPU 11 determines that "÷ remainder key?" (Step S103) of FIG. 3 is YES, and because "÷ remainder" key 12*d* is operated one time here, the CPU 11 subsequently determines that "consecutive ÷ remainder keys this time?" (Step S110) of FIG. 3 is NO.

Also, the CPU 11 sets the displayed numeric values "42. 14" once as a target-operand of a "÷ remainder" operation (registers the target-operand in the target-operand memory 13*d* of the memory 13), and as shown in FIG. 6C, displays the operation symbol "÷ remainder" above the numeric values "42. 14" in the display part 14 (Step S113).

Subsequently, when the "÷ remainder" key 12*d* is pressed once again, because this is the second consecutive input, the CPU 11 determines that "consecutive ÷ remainder keys this time?" (Step S110) of FIG. 3 is YES, and executes the "operands detection process" described in the first operation example (Step S111).

Note that since a third integer does not exist, the second operation example will be explained while referring to FIG. 4 without omitting the explanation of the processing of the "operands detection process".

Since "42. 14" (first integer, decimal point, and second integer) is stored in the input buffer 13*b* of the memory 13 upon executing the "operands detection process" shown in FIG. 4, the CPU 11 determines that "input buffer empty?" (Step S201) of FIG. 4 is NO, determines that "input buffer inputted with first integer only?" (Step S202) of FIG. 4 is NO, and further determines that "input buffer inputted with 'first integer, decimal point, and second integer'?" (Step S204) of FIG. 4 is YES.

Also, since the first integer "42" is larger than the second integer "14", the CPU 11 determines that "first integer larger than second integer?" (Step S209) of FIG. 4 is YES, and thereafter, performs processing (Step S210) that detects the first integer as operand 1 and detects the second integer as operand 2, and returns to the main routine.

Upon returning to the main routine, the CPU 11 registers the operands (operand 1 "42" and operand 2 "14") detected in the "operands detection process" in the operand memory 13*c* of the memory 13, and, as shown in FIG. 6D, displays the operands in the display part 14 in the format "divisor 1-divisor 2" (Step S112).

Specifically, the operands "42" and "14" are displayed in the numeric value display area of the display part 14 in a connected format using hyphens "-", and "divisor 1" and "divisor 2", which are character strings describing the operands, are displayed in corresponding positions thereabove.

In addition, in Step S112, the CPU 11 sets a "÷ remainder" constant lock calculation mode, and as shown in FIG. 6D, displays the constant lock character "K" in the upper left of the display part 14.

Next, after registering the operands when a numeric value "107" (post-registration numerical data) is inputted, that is, when a numeric value "1" input, a numeric value "0" input, and a numeric value "7" input are performed, the CPU 11 determines that "numeric value, etc. inputted? (Step S102) of FIG. 3 is YES repeatedly three times, and in accordance with repeating the processing of Step S109 three times, as shown in FIG. 6E, the CPU 11 displays the numeric value "107" in the display part 14.

Next, when the "=" key 12*i* is pressed, the CPU 11 determines that "=key?" (Step S104) of FIG. 3 is YES, determines that "'÷ remainder' constant lock calculation mode?" (Step S114) of FIG. 3 is YES, registers the displayed numeric value "107" in the target-operand memory 13*d*, executes a "÷ remainder" operation a plurality of times using the operands "42" and "14" with respect to "107", a target-operand that is set as the target-operand by being registered in the target-operand memory 13*d*, and displays the respective quotients and remainder in the display part 14 in the format "quotient 1-quotient 2-remainder" (Step S115).

More specifically, the CPU 11 produces, as quotient 1, a quotient "2" obtained by dividing the target-operand "107" by operand 1 "42", produces, as quotient 2, a quotient "1" obtained by dividing the remainder thereof "23" by operand 2 "14", and produces the remainder thereof "9" as the final remainder.

Also, as shown in FIG. 6F, the CPU 11 displays quotient 1 "2", quotient 2 "1", and remainder "9" in the numeric value display area of the display part 14 in a connected format using hyphens "-", and displays in corresponding positions thereabove "quotient 1", "quotient 2", and "remainder", which are character strings describing the results of the operation.

Subsequently, when a numeric value "240" (post-registration numerical data) is inputted, that is, when a numeric value "2" input, a numeric value "4" input, and a numeric value "0" input are performed, the CPU 11 determines that "numeric value, etc. inputted? (Step S102) of FIG. 3 is YES repeatedly three times, and in accordance with repeating the processing of Step S109 three times, as shown in FIG. 6G, the CPU 11 displays the numeric value "240" in the display part 14.

Also, when the "=" key 12*i* is pressed subsequent to the input of this numeric value "240" (post-registration numerical data), the CPU 11 determines that "=key?" (Step S104) of FIG. 3 is YES, determines that "'÷ remainder' constant lock calculation mode?" (Step S114) of FIG. 3 is YES, registers the displayed numeric value "240" in the target-operand memory 13*d*, executes the "÷ remainder" operation a plurality of times using the operands "42" and "14" with respect to this target-operand "240" that has been set, and displays the respective quotients and remainder in the display part 14 in the format "quotient 1-quotient 2-remainder" (Step S115).

More specifically, the CPU 11 produces, as quotient 1, a quotient "5" obtained by dividing the target-operand "240" by operand 1 "42", produces, as quotient 2, a quotient "2" obtained by dividing the remainder thereof "30" by operand 2 "14", and produces the remainder thereof "2" as the final remainder.

Also, as shown in FIG. 6H, the CPU 11 displays quotient 1 "5", quotient 2 "2", and remainder "2" in the numeric value display area of the display part 14 in a connected format using hyphens "-", and displays in corresponding positions thereabove "quotient 1", "quotient 2", "remainder", which are character strings describing the results of the calculation.

Accordance to the second operation example of calculator 1 described above, when a computation execution operation is performed in response to user operations by sequentially inputting numerical data having at least a first integer, a decimal point, and a second integer arranged in that order, pressing the "÷ remainder" key 12*d* two times, inputting post-registration numerical data, and pressing the "=" key 12*i*, the CPU 11 registers the first integer of the numerical data as a first operand, registers the second integer as a second operand, and thereafter, treating the post-registration numerical data as a target-operand, repeatedly performs division operations whereby a remainder, that is obtained by dividing the target-operand by the first operand, which has the largest numeric value of the plurality of operands, is divided by the second operand, which has the next largest numeric value, calculates the quotients and remainder of the plurality of operands, and displays the results thereof in the display part 14, thereby making it possible, with simple operations, to register a plurality of operands, and to perform a "÷ remainder" operation that uses this plurality of operands.

Furthermore, when the "÷ remainder" key 12*d* is pressed two times subsequent to the input of the numerical data, the CPU 11 registers the first integer of the numerical data as the first operand, registers the second integer as the second operand, and thereafter displays the plurality of operands in the display part 14, thereby making the plurality of registered operands easily recognizable.

Furthermore, when the "÷ remainder" key 12*d* is pressed two times subsequent to the input of the numerical data, the CPU 11 sets the plurality of registered operands in the lock mode, and thereafter, treating the inputted post-registration numerical data as the target-operand, switches to the constant lock mode for executing a "÷ remainder" operation using the plurality of operands in the lock mode, thereby making the "÷ remainder" operation easily executable using the plurality of specified operands.

Third Operation Example

FIGS. 7A to 7H are illustrations showing a third operation example of the calculator 1 according to the embodiment of the present invention.

When the "AC" key 12*h* is pressed, the CPU 11 determines that "AC key?" (Step S101) of FIG. 3 is YES, and, as shown in FIG. 7A, clears the mode displayed on the display part 14 (numeric value, constant lock, and so forth), and also displays "0.", which is the initial display, in the display part 14 (Step S108).

Next, when numerical data arranged as first integer "42", decimal point ".", second integer "14", decimal point ".", and third integer "7" are inputted, the CPU 11 determines that "numeric value, etc. inputted? (Step S102) of FIG. 3 is YES repeatedly seven times, and in accordance with repeating the processing of Step S109 seven times, as shown in FIG. 7B, the CPU 11 displays the numeric values "42. 147" in the display part 14.

Furthermore, as described in the first operation example, the display in the display part 14 of a decimal point that has been inputted for a second time is omitted.

Next, when the "÷ remainder" key 12*d* is pressed, the CPU 11 determines that "÷ remainder key?" (Step S103) of FIG. 3 is YES, and because the "÷ remainder" key 12*d* is operated one time here, the CPU 11 subsequently determines that "consecutive ÷ remainder keys this time?" (Step S110) of FIG. 3 is NO.

Also, the CPU 11 sets the displayed numeric values "42. 147" once as the target-operand of the "÷ remainder" operation (registers the target-operand in the target-operand memory 13*d* of the memory 13), and as shown in FIG. 7C, displays the operation symbol "÷ remainder" above the numeric values "42. 147" in the display part 14 (Step S113).

Subsequently, when the "÷ remainder" key 12*d* is pressed once again, because this is the second consecutive input, the CPU 11 determines that "consecutive ÷ remainder keys this time?" (Step S110) of FIG. 3 is YES, and executes the "operands detection process" described previously (Step S111).

Upon executing the "operands detection process" shown in FIG. 4, since "42. 14. 7" (first integer, decimal point, second integer, decimal point, and third integer) are stored in the input buffer 13*b* of the memory 13, the CPU 11 determines that "input buffer empty?" (Step S201) of FIG. 4 is NO, and thereafter determines that "input buffer inputted with first integer only?" (Step S202) of FIG. 4 is NO, further determines that "input buffer inputted with 'first integer, decimal point, second integer'?" (Step S204) of FIG. 4 is NO, and determines that "input buffer inputted with 'first integer, decimal point, second integer, decimal point, and third integer'?" (Step S205) of FIG. 4 is YES.

Since the first integer "42" is larger than the second integer "14", and the second integer "14" is larger than the third integer "7", the CPU 11 determines that "first integer larger than second integer?" (Step S206) of FIG. 4 is YES, also determines that "second integer larger than third integer?" (Step S207) of FIG. 4 is YES, performs processing that detects the first integer as operand 1, detects the second integer as operand 2, and detects the third integer as operand 3 (Step S208), and returns to the main routine.

Upon returning to the main routine, the CPU 11 registers the operands (operand 1 "42", operand 2 "14", and operand 3 "7") detected in the "operands detection process" in the operand memory 13*c* of the memory 13, and, as shown in FIG. 7D, displays the operands in the display part 14 in the format "divisor 1-divisor 2-divisor 3" (Step S112).

Specifically, the CPU 11 displays the operands "42", "14", and "7" in the numeric value display area of the display part 14 in a connected format using hyphens "-", and displays in corresponding positions thereabove "divisor 1", "divisor 2", and "divisor 3", which are character strings describing the operands.

In addition, in Step S112, the CPU 11 sets the "÷ remainder" constant lock calculation mode, and as shown in FIG. 7D, displays the constant lock character "K" in the upper left of the display part 14.

Next, when a numeric value "107" (post-registration numerical data) is inputted, that is, when a numeric value "1" input, a numeric value "0" input, and a numeric value "7" input are performed, the CPU 11 determines that "numeric value or the like inputted? (Step S102) of FIG. 3 is YES repeatedly three times, and in accordance with repeating the processing of Step S109 three times, as shown in FIG. 7E, the CPU 11 displays the numeric value "107" in the display part 14.

Next, when the "=" key 12*i* is pressed, the CPU 11 determines that "=key?" (Step S104) of FIG. 3 is YES, determines that "'÷ remainder' constant lock calculation mode?" (Step S114) of FIG. 3 is YES, registers the displayed numeric value "107" in the target-operand memory 13*d*, executes the "÷ remainder" operation a plurality of times using the operands "42", "14", "7" with respect to "107", the target-operand that was set by being registered, and displays the respective quotients and remainder in the display part 14 in the format "quotient 1-quotient 2-quotient 3-remainder" (Step S115).

Specifically, the CPU 11 produces, as quotient 1, a quotient "2" obtained by dividing the target-operand "107" by operand 1 "42", produces, as quotient 2, a quotient "1" obtained by dividing the remainder thereof "23" by operand 2 "14", produces, as quotient 3, a quotient "1" obtained by dividing the remainder thereof "9" by operand 3 "7", and sets the remainder thereof "2" as the final remainder.

Also, as shown in FIG. 7F, the CPU 11 displays quotient 1 "2", quotient 2 "1", quotient 3 "1", and remainder "2" in the numeric value display area of the display part 14 in a connected format using hyphens "-", and displays in corresponding positions thereabove "quotient 1", "quotient 2", "quotient 3", and "remainder", which are character strings describing the results of the operation.

Subsequently, when a numeric value "240" (post-registration numerical data) is inputted, that is, when a numeric value "2" input, a numeric value "4" input, and a numeric value "0" input are performed, the CPU 11 determines that "numeric value or the like inputted? (Step S102) of FIG. 3 is YES repeatedly three times, and in accordance with repeating the processing of Step S109 three times, as shown in FIG. 7G, the CPU 11 displays the numeric value "240" in the display part 14.

Also, when the "=" key 12*i* is pressed subsequent to the input of this numeric value "240" (post-registration numerical data), the CPU 11 determines that "=key?" (Step S104) of FIG. 3 is YES, also determines that "'÷ remainder' constant lock calculation mode?" (Step S114) of FIG. 3 is YES, registers the displayed numeric value "240" in the target-operand memory 13*d*, executes the "÷ remainder" operation a plurality of times using the operands "42", "14", and "7" with respect to this target-operand "240", and displays the respective quotients and remainder in the display part 14 in the format "quotient 1-quotient 2-quotient 3-remainder" (Step S115).

More specifically, the CPU 11 sets, as quotient 1, a quotient "5" obtained by dividing the target-operand "240" by operand 1 "42", sets, as quotient 2, a quotient "2" obtained by dividing the remainder thereof "30" by operand 2 "14", sets, as quotient 3, a quotient "0" obtained by dividing the remainder thereof "2" by operand 3 "7", and sets the remainder thereof "2" as the final remainder.

Also, as shown in FIG. 7H, the CPU 11 displays quotient 1 "5", quotient 2 "2", quotient 3 "0", and remainder "2" in the numeric value display area of the display part 14 in a connected format using hyphens "-", and displays in corresponding positions thereabove "quotient 1", "quotient 2", "quotient 3", and "remainder", which are character strings describing the results of the operation.

According to the third operation example of calculator 1 described above, when a calculation execution operation is performed in response to user operations by sequentially inputting numerical data arranged in the order of a first integer, a decimal point, a second integer, a decimal point, and a third integer, pressing the "÷ remainder" key 12*d* two times, inputting post-registration numerical data, and pressing the "=" key 12*i*, the CPU 11 registers the first integer of the numerical data as a first operand, registers the second integer as a second operand, and registers the third integer as a third operand, and thereafter, treating the post-registration numerical data as a target-operand, calculates the quotients and remainder of the plurality of operands by dividing the target-operand by the first operand, which has the largest numeric value of the plurality of operands, dividing the remainder thereof by the second operand, which has the next largest numeric value, and, in addition, dividing the remainder thereof by the third operand, and displays the results thereof in the display part 14, thereby making it possible, with simple operations, to register a plurality of operands, and to perform a "÷ remainder" operation that uses this plurality of operands.

Furthermore, when the "÷ remainder" key 12*d* is pressed two times subsequent to the input of the numerical data, the CPU 11 registers the first integer of the numerical data as the first operand, registers the second integer as the second operand, and registers the third integer as the third operand, and thereafter displays the plurality of operands in the display part 14, thereby making the plurality of registered operands easily recognizable.

Furthermore, when the "÷ remainder" key 12*d* is pressed two times subsequent to the input of the numerical data, the CPU 11 sets the plurality of registered operands in the lock mode, and thereafter, treating the inputted post-registration numerical data as the target-operand, switches to the constant lock mode for executing the "÷ remainder" operation using the plurality of operands in the lock mode, thereby making the "÷ remainder" operation easily executable using the plurality of specified operands.

Fourth Operation Example

FIGS. 8A to 8H are illustrations showing a fourth operation example of the calculator 1 according to the embodiment of the present invention.

When the "AC" key 12*h* is pressed, the CPU 11 determines that "AC key?" (Step S101) of FIG. 3 is YES, and, as shown in FIG. 8A, clears the mode displayed on the display part 14 (numeric value, constant lock, and so forth), and also displays "0.", which is the initial display, in the display part 14 (Step S108).

Next, when numerical data arranged as first integer "168", decimal point ".", second integer "4221" is inputted, the CPU 11 determines that "numeric value or the like inputted?" (Step S102) of FIG. 3 is YES repeatedly eight times, and in accordance with repeating the processing of Step S109 eight times, as shown in FIG. 8B, the CPU 11 displays the numeric value "168. 4221" in the display part 14.

Note that, in the numeric value "168. 4221" inputted here, the second integer "4221" is larger than the first integer "168", and therefore the numeric value "168. 4221" constitutes an example of an input error in which the inputting of the second decimal point has been forgotten.

Next, when the "÷ remainder" key 12*d* is pressed, the CPU 11 determines that "÷ remainder key?" (Step S103) of FIG. 3 is YES, and because the "÷ remainder" key 12*d* is operated one time here, the CPU 11 subsequently determines that "consecutive ÷ remainder keys this time?" (Step S110) of FIG. 3 is NO.

Also, the CPU 11 sets the displayed numeric value "168. 4221" once as the target-operand of the "÷ remainder" operation (registers the target-operand in the target-operand memory 13*d* of the memory 13), and as shown in FIG. 8C, displays the operation symbol "÷ remainder" above the numeric value "168. 4221" in the display part 14 (Step S113).

Subsequently, when the "÷ remainder" key 12*d* is pressed once again, because this is the second consecutive input, the CPU 11 determines that "consecutive ÷ remainder keys this time?" (Step S110) of FIG. 3 is YES, and executes the "operands detection process" described previously (Step S111).

Since "168. 4221" (first integer, decimal point, and second integer) is stored in the input buffer 13*b* of the memory 13 when the "operands detection process" shown in FIG. 4 is executed, the CPU 11 determines that "input buffer empty?" (Step S201) of FIG. 4 is NO, determines that "input buffer inputted with first integer only?" (Step S202) of FIG. 4 is NO, and determines that "input buffer inputted with 'first integer, decimal point, and second integer'?" (Step S204) of FIG. 4 is YES.

Also, because the first integer "168" is smaller than the second integer "4221", the CPU 11 determines that Step S209 is NO, and advances to the processing of Step S211.

The first integer "168" is smaller than the second integer "4221" here, and the second integer "4221" can be split into a front-side numeric value "42" that is smaller than the first integer "168", and a back-side numeric value "21" that is smaller than the front-side numeric value.

Therefore, the CPU 11 determines that "second integer capable of being split into front-side numeric value of front-side portion that is smaller than first integer, and back-side numeric value of back-side portion that is smaller than front-side numeric value?" (Step S211) of FIG. 4 is YES, performs processing (Step S212) that detects the first integer "168" as operand 1, detects the front-side numeric value "42" of the second integer as operand 2, and detects the back-side numeric value "21" of the second integer as operand 3, and returns to the main routine.

That is, even when there is an input error in which the inputting of a second decimal point has been forgotten, when the second integer can be split into a front-side numeric value of a front-side portion that is smaller than the first integer, and a back-side numeric value of a back-side portion that is smaller than the front-side numeric value, the CPU 11 is configured to automatically perform correction processing.

Furthermore, the CPU 11 performs processing that changes the position for splitting the numeric string of the second integer sequentially from the front side, and detects the front-side numeric value and the back-side numeric value as described above, but in a case where a front-side numeric value and a back-side numeric value cannot be detected as described above, the CPU 11 determines that Step S211 is NO, and performs other processing (e.g., error processing).

Upon returning to the main routine, the CPU 11 registers the operands (operand 1 "168", operand 2 "42", and operand 3 "21") detected in the "operands detection process" in the operand memory 13*c* of the memory 13, and, as shown in FIG. 8D, displays the operands in the display part 14 in the format "divisor 1-divisor 2-divisor 3" (Step S112).

Specifically, the CPU 11 displays the operands "168", "42", and "21" in a numeric value display area of the display part 14 in a connected format using hyphens "-", and displays in corresponding positions thereabove "divisor 1", "divisor 2", and "divisor 3", which are character strings describing the operands.

In addition, in Step S112, the CPU 11 sets the "÷ remainder" constant lock calculation mode, and as shown in FIG. 8D, displays the constant lock character "K" in the upper left of the display part 14.

Furthermore, in a case where a user sees the operands (operand 1 "168", operand 2 "42", and operand 3 "21") displayed in the display part 14, and wishes to correct the operand, a correction can be made using the same correction procedures described in the first operation example.

Next, when a numeric value "310" (post-registration numerical data) is inputted, that is, when a numeric value "3" input, a numeric value "1" input, and a numeric value "0" input are performed, the CPU 11 determines that "numeric value, etc. inputted?" (Step S102) of FIG. 3 is YES repeatedly three times, and in accordance with repeating the processing of Step S109 three times, as shown in FIG. 8E, the CPU 11 displays the numeric value "310" in the display part 14.

Next, when the "=" key 12*i* is pressed, the CPU 11 determines that "=key?" (Step S104) of FIG. 3 is YES, also determines that "'÷ remainder' constant lock calculation mode?" (Step S114) of FIG. 3 is YES, registers the displayed numeric value "310" in the target-operand memory 13*d*, executes the "÷ remainder" operation a plurality of times using the operands "168", "42", and "21" with respect to "310", which is the target-operand that was set by being registered, and displays the respective quotients and remainder in the display part 14 in the format "quotient 1-quotient 2-quotient 3-remainder" (Step S115).

More specifically, the CPU 11 produces, as quotient 1, a quotient "1" obtained by dividing the target-operand "310" by operand 1 "168", produces, as quotient 2, a quotient "3" obtained by dividing the remainder thereof "142" by operand 2 "42", produces, as quotient 3, a quotient "0" obtained by dividing the remainder thereof "16" by operand 3 "21", and produces the remainder thereof "16" as the final remainder.

Also, as shown in FIG. 8F, the CPU 11 displays quotient 1 "1", quotient 2 "3", quotient 3 "0", and remainder "16" in the numeric value display area of the display part 14 in a connected format using hyphens "-", and displays in corresponding positions thereabove "quotient 1", "quotient 2", "quotient 3", and "remainder", which are character strings describing the results of the operation.

Subsequently, when a numeric value "375" (post-registration numerical data) is inputted, that is, when a numeric value "3" input, a numeric value "7" input, and a numeric value "5" input are performed, the CPU 11 determines that "numeric value, etc. inputted?" (Step S102) of FIG. 3 is YES repeatedly three times, and in accordance with repeating the processing of Step S109 three times, as shown in FIG. 8G, the CPU 11 displays the numeric value "375" in the display part 14.

Also, when the "=" key 12*i* is pressed subsequent to the input of this numeric value "375" (post-registration numerical data), the CPU 11 determines that "=key?" (Step S104) of FIG. 3 is YES, determines that "'÷ remainder' constant lock calculation mode?" (Step S114) of FIG. 3 is YES, registers the displayed numeric value "375" in the target-operand memory 13*d*, executes the "÷ remainder" operation a plurality of times using the operands "168", "42", and "21"

with respect to "375", which is the target-operand that was set by being registered, and displays the respective quotients and remainder in the display part 14 in the format "quotient 1-quotient 2-quotient 3-remainder" (Step S115).

More specifically, the CPU 11 sets, as quotient 1, a quotient "2" obtained by dividing the target-operand "375" by operand 1 "168", sets, as quotient 2, a quotient "0" obtained by dividing the remainder thereof "39" by operand 2 "42", sets, as quotient 3, a quotient "1" obtained by dividing the remainder thereof "39" by operand 3 "21", and sets the remainder thereof "18" as the final remainder.

Also, as shown in FIG. 8H, the CPU 11 displays quotient 1 "2", quotient 2 "0", quotient 3 "1", and remainder "18" in the numeric value display area of the display part 14 in a connected format using hyphens "-", and displays in corresponding positions thereabove "quotient 1", "quotient 2", "quotient 3", and "remainder", which are character strings describing the results of the operation.

According to the fourth operation example of calculator 1 described above, when the second integer is larger than the first integer, the CPU 11 splits the second integer numeric string into a front-side numeric value of a front-side portion that is smaller than the first integer, and a back-side numeric value of a back-side portion that is smaller than the front-side numeric value, registers the front-side numeric value as the second operand, and registers the back-side numeric value as the third operand, thereby making an appropriate second integer and third integer automatically registerable even when a required decimal point input between the second integer and the third integer was forgotten.

Fifth Operation Example

FIGS. 9A to 9I are illustrations showing a fifth operation example of the calculator 1 according to the embodiment of the present invention.

When the "AC" key 12h is pressed, the CPU 11 determines that "AC key?" (Step S101) of FIG. 3 is YES, and as shown in FIG. 9A, clears the mode displayed on the display part 14 (numeric values, constant lock, and so forth), and displays "0.", which is the initial display, in the display part 14 (Step S108).

Next, when numerical data arranged as first integer "168", decimal point ".", and second integer "42" is inputted, the CPU 11 determines that "numeric value, etc. inputted? (Step S102) of FIG. 3 is YES repeatedly six times, and in accordance with repeating the processing of Step S109 six times, as shown in FIG. 9B, the CPU 11 displays the numeric value "168. 42" in the display part 14.

Note that the numeric value "168. 42" inputted here should have been inputted as "168. 4. 2", and is an example of an input error in which the inputting of the second decimal point has been forgotten, showing a case in which an input error determination as in the fourth operation example is not possible.

Next, when the "÷ remainder" key 12d is pressed, the CPU 11 determines that "÷ remainder key?" (Step S103) of FIG. 3 is YES, and because the "÷ remainder" key 12d is operated one time here, the CPU 11 subsequently determines that "consecutive ÷ remainder keys this time?" (Step S110) of FIG. 3 is NO.

Also, the CPU 11 sets the displayed numeric value "168. 42" once as a target-operand of a "÷ remainder" operation (registers the target-operand in the target-operand memory 13d of the memory 13), and as shown in FIG. 9C, displays the operation symbol "÷ remainder" above the numeric value "168. 42" in the display part 14 (Step S113).

Subsequently, when the "÷ remainder" key 12d is pressed once again, because this is the second consecutive input, the CPU 11 determines that "consecutive ÷ remainder keys this time?" (Step S110) of FIG. 3 is YES, and executes the "operands detection process" described previously (Step S111).

Since "168. 42" (first integer, decimal point, and second integer) is stored in the input buffer 13b of the memory 13 when the "operands detection process" shown in FIG. 4 is executed, the CPU 11 determines that "input buffer empty?" (Step S201) of FIG. 4 is NO, determines that "input buffer inputted with first integer only?" (Step S202) of FIG. 4 is NO, and in addition determines that "input buffer inputted with 'first integer, decimal point, and second integer'?" (Step S204) of FIG. 4 is YES.

Also, since the first integer "168" is larger than the second integer "42", the CPU 11 determines that "first integer larger than second integer?" (Step S209) of FIG. 4 is YES, and performs processing (Step S210) that detects the first integer as operand 1, and detects the second integer as operand 2, and returns to the main routine.

Upon returning to the main routine, the CPU 11 registers the operands (operand 1 "168" and operand 2 "42") detected in the "operands detection process" in the operand memory 13c of the memory 13, and, as shown in FIG. 9D, displays the operands in the display part 14 in the format "divisor 1-divisor 2" (Step S112).

Specifically, the operands "168" and "42 are displayed in the numeric value display area of the display part 14 in a connected format using hyphens "-", and "divisor 1" and "divisor 2", which are character strings describing the operands, are displayed in corresponding positions thereabove.

In addition, in Step S112, the CPU 11 sets the "÷ remainder" constant lock calculation mode, and as shown in FIG. 9D, displays the constant lock character "K" in the upper left of the display part 14.

At this point, the user sees the display on the display part 14 shown in FIG. 9D, and realizes that an input error has been made with respect to the operands (operand 2 and operand 3).

That is, the user should have inputted "168. 4. 2" as operand 1 "168", operand 2 "4", and operand 3 "2", but mistakenly inputted the numeric values "168. 42", and therefore, as shown in FIG. 9D, sees "168-42" displayed in the display part 14 and can recognize the input error.

Also, when there are no mistakes in a numeric string itself that has been inputted in this manner, the user can easily correct an operand by pressing the "divisor display/conversion" key 12e as described in detail below.

When the "divisor display/conversion" key 12e is pressed, the CPU 11 determines that "divisor display/conversion key?" (Step S106) of FIG. 3 is YES, and thereafter, determines that "divisor detected? (divisors displayed in the format of divisor 1-divisor 2 . . . ?)" (Step S121) of FIG. 3 is YES, and determines that "operand 3 (divisor 3) exists?" (Step S124) of FIG. 3 is NO.

Also, because the second integer "42" can be split into a front-side numeric value "4" that is smaller than the first integer "168", and a back-side numeric value "2" that is smaller than the front-side numeric value, the CPU 11 determines that "second integer can be split into front-side numeric value and back-side numeric value (that is, "second integer can be split into front-side numeric value of front-side portion that is smaller than first integer, and back-side numeric value of back-side portion that is smaller than front-side numeric value")?" (Step S125) of FIG. 3 is YES, detects the first integer "168" as operand 1, detects the front-side numeric value "4" of the second integer as operand 2, and detects the back-side numeric value "2" of the second integer as operand 3 (Step S126).

Next, the CPU 11 registers the operands (operand 1 "168", operand 2 "4", and operand 3 "2") detected in Step S126 in the operand memory 13c of the memory 13, and, as shown in FIG. 9E, displays the operands in the display part 14 in the format "divisor 1-divisor 2-divisor 3" (Step S123).

Specifically, the CPU 11 displays the operands "168", "4", and "2" in the numeric value display area of the display part 14 in a connected format using hyphens "-", and displays in corresponding positions thereabove "divisor 1", "divisor 2", and "divisor 3", which are character strings describing the operands.

Furthermore, in the above example, there is one combination for splitting the second integer into front and back, but when a plurality of combinations exist for splitting the second integer into front and back, the CPU 11 can process such a case by presetting, for example, so as to select the largest back-side numeric value that satisfies a condition whereby the front-side numeric value of the second integer is smaller than the first integer and the back-side numeric value of the second integer is smaller than the front-side numeric value.

In particular, ensuring that the back-side numeric value constitutes a large numeric value facilitates the exclusion of numeric value "1", which cannot be set as a divisor, to be selected as the third operand.

Furthermore, when there is a plurality of combinations for splitting the second integer into front and back, operand 2 and operand 3 obtained by automatically splitting the second integer into front and back and registered could differ from the numeric values desired by the user, in which case, when the user presses the "divisor display/conversion" key 12e once again, a different combination is presented as described in detail below.

When the "divisor display/conversion" key 12e is pressed a second time, the CPU 11 determines that "divisor display/conversion key?" (Step S106) of FIG. 3 is YES, determines that "divisor detected? (divisors displayed in format divisor 1-divisor 2 . . . ?)" (Step S121) of FIG. 3 is YES, and determines that "operand 3 (divisor 3) exists?" (Step S124) of FIG. 3 is YES.

The CPU 11 subsequently determines that "when splitting numeric string, is there a new combination? (that is, "when numeric string arranging operand 2 and operand 3 in order is split into front and back, is there any combination of operand 2 and operand 3 different from previous combination of operand 2 and operand 3")?" (Step S127) of FIG. 3 is YES, registers the new combination of operand 2 and operand 3 in the operand memory 13c of the memory 13, and displays the operands in the display part 14 in the format "divisor 1-divisor 2-divisor 3" (Step S128).

This enables the user to press the "divisor display/conversion" key 12e until a desired operand 2 and operand 3 are displayed, and to register the desired operand 2 and operand 3.

When, subsequent to the registration of the operands (operand 1, operand 2, and operand 3) having been performed in this way, a numeric value "310" (post-registration numerical data) is inputted, that is, a numeric value "3" input, a numeric value "1" input, and a numeric value "0" input are performed, the CPU 11 determines that "numeric value or the like inputted?" (Step S102) of FIG. 3 is YES repeatedly three times, and in accordance with repeating the processing of Step S109 three times, as shown in FIG. 9F, the CPU 11 displays the numeric value "310" in the display part 14.

Next, when the "=" key 12i is pressed, the CPU 11 determines that "=key?" (Step S104) of FIG. 3 is YES, determines that "'÷ remainder' constant lock calculation mode?" (Step S114) of FIG. 3 is YES, registers the displayed numeric value "310" in the target-operand memory 13d, executes the "÷ remainder" operation a plurality of times using the operands "168", "4" and "2" with respect to "310", which is the target-operand that was set by being registered, and displays the respective quotients and remainder in the display part 14 in the format "quotient 1-quotient 2-quotient 3-remainder" (Step S115).

More specifically, the CPU 11 sets, as quotient 1, a quotient "1" obtained by dividing the target-operand "310" by operand 1 "168", sets, as quotient 2, a quotient "35" obtained by dividing the remainder thereof "142" by operand 2 "4", sets, as quotient 3, a quotient "1" obtained by dividing the remainder thereof "2" by operand 3 "2", and sets the remainder thereof "0" as the final remainder.

Also, as shown in FIG. 9G, the CPU 11 displays quotient 1 "1", quotient 2 "35", quotient 3 "1", and remainder "0" in the numeric value display area of the display part 14 in a connected format using hyphens "-", and displays in corresponding positions thereabove "quotient 1", "quotient 2", "quotient 3", and "remainder", which are character strings describing the results of the operation.

Subsequently, when a numeric value "375" (post-registration numerical data) is inputted, that is, when a numeric value "3" input, a numeric value "7" input, and a numeric value "5" input are performed, the CPU 11 determines that "numeric value or the like inputted?" (Step S102) of FIG. 3 is YES repeatedly three times, and in accordance with repeating the processing of Step S109 three times, as shown in FIG. 9H, the CPU 11 displays the numeric value "375" in the display part 14.

Also, when the "=" key 12i is pressed subsequent to the input of this numeric value "375" (post-registration numerical data), the CPU 11 determines that "=key?" (Step S104) of FIG. 3 is YES, determines that "'÷ remainder' constant lock calculation mode?" (Step S114) of FIG. 3 is YES, registers the displayed numeric value "375" in the target-operand memory 13d, executes the "÷ remainder" operation a plurality of times using the operands "168", "4" and "2" with respect to "375", which is the target-operand that was set by being registered, and displays the respective quotients and remainder in the display part 14 in the format "quotient 1-quotient 2-quotient 3-remainder" (Step S115).

More specifically, the CPU 11 sets, as quotient 1, a quotient "2" obtained by dividing the target-operand "375" by operand 1 "168", sets, as quotient 2, a quotient "9" obtained by dividing the remainder thereof "39" by operand 2 "4", sets, as quotient 3, a quotient "1" obtained by dividing the remainder thereof "3" by operand 3 "2", and sets the remainder thereof "1" as the final remainder.

Also, as shown in FIG. 9I, the CPU 11 displays quotient 1 "2", quotient 2 "9", quotient 3 "1", and remainder "1" in the numeric value display area of the display part 14 in a connected format using hyphens "-", and displays in corresponding positions thereabove "quotient 1", "quotient 2", "quotient 3", and "remainder", which are character strings describing the results of the operation.

According to the fifth operation example of calculator 1 described above, similar to the examples of the second operation and the third operation, a plurality of operands can be registered, and a "÷ remainder" operation that uses this plurality of operands can be performed with simple operations, but when the "divisor display/conversion" key 12e is pressed while operand 1 and operand 2 are being displayed in the display part 14, the CPU 11 splits the numeric string of the second integer into a front-side numeric value, which is a portion on the front side that is smaller than the first integer, and a back-side numeric value, which is a portion on the back side that is smaller than the front-side numeric value, registers the front-side numeric value as the second operand, and registers the back-side numeric value as the third operand, thereby enabling the registration of an appropriate second integer and third integer even when a required decimal point input between the second integer and the third integer has been forgotten.

Modification Example

Judging from trends, such as goods packing patterns, for example, as combinations of operand 1, operand 2, and operand 3, there are many cases in which the number of packing containers for goods constitutes integer multiples in terms of large, medium, and small, like a large packing container for 42, a medium packing container for 14, and a small packing container for 7, as in the first operation example and so forth.

Figure 10:
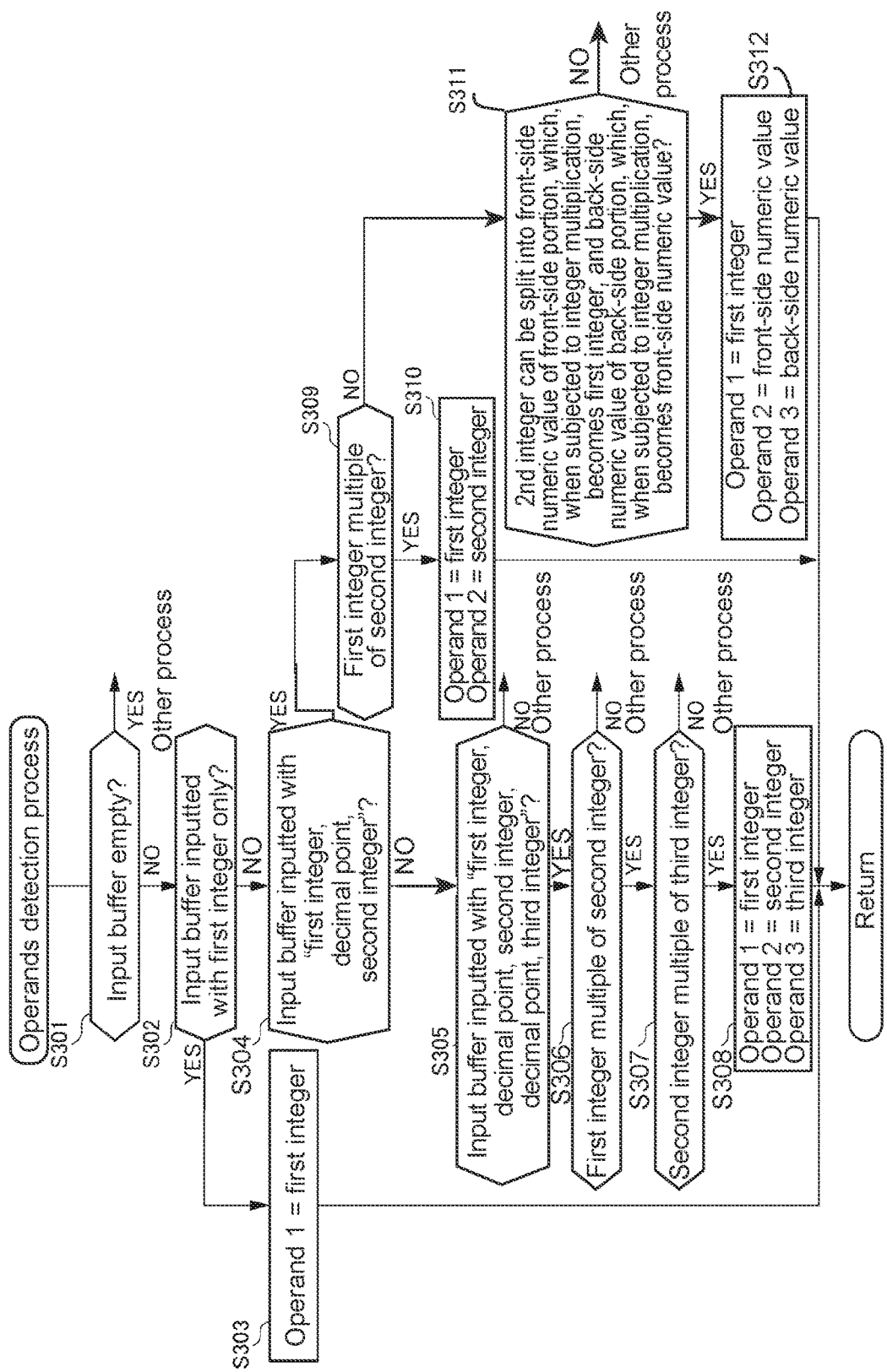
FIG. 10 is a flowchart showing a modification example of a control procedure (subroutine) of the calculator according to the embodiment of the present invention.

Therefore, as in a modification example shown in FIG. 10, the operands detection process may be performed on the basis of a combination of operands that constitutes integer multiples.

The modification example of the operands detection process will be explained below while referring to FIG. 10, but the point that differs from FIG. 4 is merely that the determination criteria is "integer?" instead of "large?" as in FIG. 4; otherwise the flow of processing procedures is the same as the flow shown in FIG. 4.

When executing the "operands detection process" shown in FIG. 10, in a case where "168. 4221" (first integer, decimal point, and second integer), for example, is stored in the input buffer 13b of the memory 13, the CPU 11 determines that "input buffer empty?" (Step S301) of FIG. 10 is NO, determines that "input buffer inputted with first integer only?" (Step S302) of FIG. 10 is NO, and, in addition, determines that "input buffer inputted with 'first integer, decimal point, and second integer'?" (Step S304) of FIG. 10 is YES.

Also, because the first integer "168" is not a multiple of the second integer "4221", and the second integer "4221" can be split into a front-side numeric value "42", which, when subjected to integer multiplication, becomes the first integer "168", and a back-side numeric value "21", which, when subjected to integer multiplication, becomes the front-side numeric value "42", the CPU 11 determines that "first integer is multiple of second integer?" (Step S309) of FIG. 10 is NO, determines that "second integer can be split into front-side numeric value of front-side portion, which, when subjected to integer multiplication, becomes first integer, and back-side numeric value of back-side portion, which, when subjected to integer multiplication, becomes front-side numeric value?" (Step S311) of FIG. 10 is YES, and thereafter, performs processing (Step S312) that detects the first integer as operand 1, detects the front-side numeric value of the second integer as operand 2, and detects the back-side numeric value of the second integer as operand 3.

In a case where integer multiplication is treated as the determination criteria, although the illustration of the main routine corresponding to FIG. 3 is omitted, the portions corresponding to Steps S125 and S127 of FIG. 3 are simply changed to determinations made based on "integer multiplication".

Furthermore, in this modification example as well, in a case where the second integer is split into a front-side numeric value and a back-side numeric value in the above-described manner, the back-side numeric value could conceivably become "1", but since a divisor of "1" is not suitable for a "÷ remainder" operation, it is preferable that a back-side numeric value of "1" be excluded automatically.

The calculator 1 of the present invention has been described above on the basis of specific embodiments, but the present invention is not limited to the specific embodiments described above, and various modifications and improvements are included within the technical scope of the present invention, as will be clear to a person skilled in the art from the disclosures in the claims.

For example, in the above embodiments, a decimal point is used as a delimiter separating a first integer and a second integer, and when a first integer, a decimal point, and a second integer are inputted, the first integer is registered as a first operand, and the second integer is registered as a second operand; however, an input key for a special delimiter (e.g., "-", ",", or the like) for separating the first integer and the second integer may be provided on the keyboard of the calculator (electronic calculator), so that when a first integer, a delimiter "-", and a second integer are inputted, the first integer is registered as a first operand, and the second integer is registered as a second operand.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A calculator comprising:
   a plurality of numeric keys;
   a plurality of operation keys, including a first operation key and a second operation key;
   a delimiter key;
   a memory; and
   a processor,
   wherein said processor is configured to:
   when a first numerical data having at least a first integer, a delimiter, and a second integer arranged in that order has been received via operations by a user of said delimiter key and at least one of said plurality of numeric keys and when the first integer is larger than the second integer or the first integer is an integer multiple of the second integer, upon receiving a prescribed operation of the first operation key, register said first integer in said memory as a first operand, and registers said second integer in said memory as a second operand;

thereafter, receive an integer as a target operand that is input via an operation or operations of at least one of said plurality of numeric keys; and when the second operation key is operated after registration of said first integer and said second integer in said memory, register in said memory said target-operand, and perform a prescribed arithmetic operation on said target-operand registered in said memory using a plurality of registered operands that include the registered first and second operands.

2. The calculator according to claim 1, wherein when said first numerical data that have been received further had a delimiter and a third integer arranged after said second integer and when said processor determines that the third integer is smaller than the second integer, said processor registers said third integer in said memory as a third operand as one of the plurality of registered operands.

3. The calculator according to claim 1, wherein when said processor determines that the second integer is larger than said first integer, the processor breaks up a numeric string of said second integer into a front-side numeric value that is a front-side portion of said numeric string, and a back-side numeric value that is a remaining back-side portion of said numeric string.

4. The calculator according to claim 3, wherein said processor breaks up the numeric string of said second integer so that said front-side numeric value is smaller than said first integer, and so that said back-side numeric value is smaller than said front-side numeric value.

5. The calculator according to claim 4, wherein said processor registers said front-side numeric value as said second operand, and registers said back-side numeric value as said third operand.

6. The calculator according to claim 3, wherein said processor registers said front-side numeric value as said second operand, and registers said back-side numeric value as said third operand.

7. The calculator according to claim 1, wherein when said first integer is not an integer multiple of the second integer, said processor breaks up a numeric string of said second integer into a front-side numeric value that is a front-side portion of said numeric string, and a back-side numeric value that is a remaining back-side portion of said numeric string.

8. The calculator according to claim 7, wherein said processor performs the breakup of said numeric string so that said first integer is an integer multiple of said front-side numeric value, and so that said front-side numeric value is an integer multiple of said back-side numeric value.

9. The calculator according to claim 1, wherein said prescribed operation of said one of said plurality of operation keys is a pressing operation of said first operation key successively a plurality of times.

10. The calculator according to claim 9, further comprising:
a display part,
wherein said processor displays a plurality of said operands on said display part when said prescribed operation is performed.

11. The calculator according to claim 1,
wherein in performing said prescribed arithmetic operation performed on said target-operand, the processor divides said target-operand by the first operand, as a first divisor, and divides a remainder of the division by the first divisor by the second operand, and obtains respective quotients and a resulting remainder.

12. The calculator according to claim 11, further comprising:
a display part,
wherein said processor displays said calculated quotients and the remainder on said display part.

13. A calculator, comprising:
a plurality of numeric keys;
a plurality of operation keys, including a first operation key, a second operation key, and a third operation key;
a delimiter key;
a memory; and
a processor,
wherein said processor is configured to:
when an integer is inputted via an operation or operations of at least one of the plurality of numeric keys, and when the first operation key is pressed one time thereafter, register the integer as a target operand in said memory;
when a first numerical data having at least a first integer, a delimiter, and a second integer arranged in that order has been received via operations by a user of said delimiter key and at least one of said plurality of numeric keys and when the first integer is larger than the second integer or the first integer is an integer multiple of the second integer, upon receiving an operation of the second operation key, register said first integer of the first numerical data in said memory as a first operand, and register said second integer of the first numerical data in said memory as a second operand; and upon receiving an operation of the third operation key, perform a prescribed arithmetic operation on said target-operand using the first and second operands, or if the first and second operands are updated since the operation of the second operation key, using the updated first and second operands.

14. The calculator according to claim 13, wherein in performing said prescribed arithmetic operation, the processor divides said target-operand by the first operand, as a first divisor, and divides a remainder of the division by the first divisor by the second operand, and obtains respective quotients and a resulting remainder.

15. The calculator according to claim 13, wherein said second operation key that is pressed after the first numerical data is inputted is a display key.

16. The calculator according to claim 15, further comprising:
a display part,
wherein said processor displays the updated first and second operands on said display part.

17. The calculator according to claim 1, wherein said processor is further configured to cause a result of the prescribed arithmetic operation to be outputted to the user.

18. A method performed by a processor in a calculator that includes:
a plurality of numeric keys; a plurality of operation keys including a first operation key and a second operation key; a delimiter key; a memory; and said processor, the method comprising, via the processor:
when a first numerical data having at least a first integer, a delimiter, and a second integer arranged in that order has been received via operations by a user of said delimiter key and at least one of said plurality of numeric keys and when the first integer is larger than the second integer or the first integer is an integer multiple of the second integer, upon receiving a prescribed operation of the first operation key, registering said first integer in said memory as a first operand, and registering said second integer in said memory as a second operand;

thereafter, receiving an integer as a target operand that is input via an operation or operations of at least one of said plurality of numeric keys; and when the second operation key is operated after registration of said first integer and said second integer in said memory, registering in said memory said target-operand, and performing a prescribed arithmetic operation on said target-operand registered in said memory using a plurality of registered operands that include the registered first and second operands.

19. The method according to claim 18, further comprising causing a result of the prescribed arithmetic operation to be outputted to the user.

20. A computer-readable non-transitory storage medium having stored thereon a program that causes a processor in a calculator that includes: a plurality of numeric keys; a plurality of operation keys including a first operation key and a second operation key; a delimiter key; a memory; and said processor, to perform the following:

when a first numerical data having at least a first integer, a delimiter, and a second integer arranged in that order has been received via operations by a user of said delimiter key and at least one of said plurality of numeric keys and when the first integer is larger than the second integer or the first integer is an integer multiple of the second integer, upon receiving a prescribed operation of the first operation key, registering said first integer in said memory as a first operand, and registering said second integer in said memory as a second operand;

thereafter, receiving an integer as a target operand that is input via an operation or operations of at least one of said plurality of numeric keys; and when the second operation key is operated after registration of said first integer and said second integer in said memory, registering in said memory the target-operand, and performing a prescribed arithmetic operation on said target-operand registered in said memory using a plurality of registered operands that include the registered first and second operands.

* * * * *